Jan. 22, 1957   D. A. DOBBINS   2,778,480
CONVEYOR ELEMENT
Filed Jan. 27, 1955   2 Sheets-Sheet 1
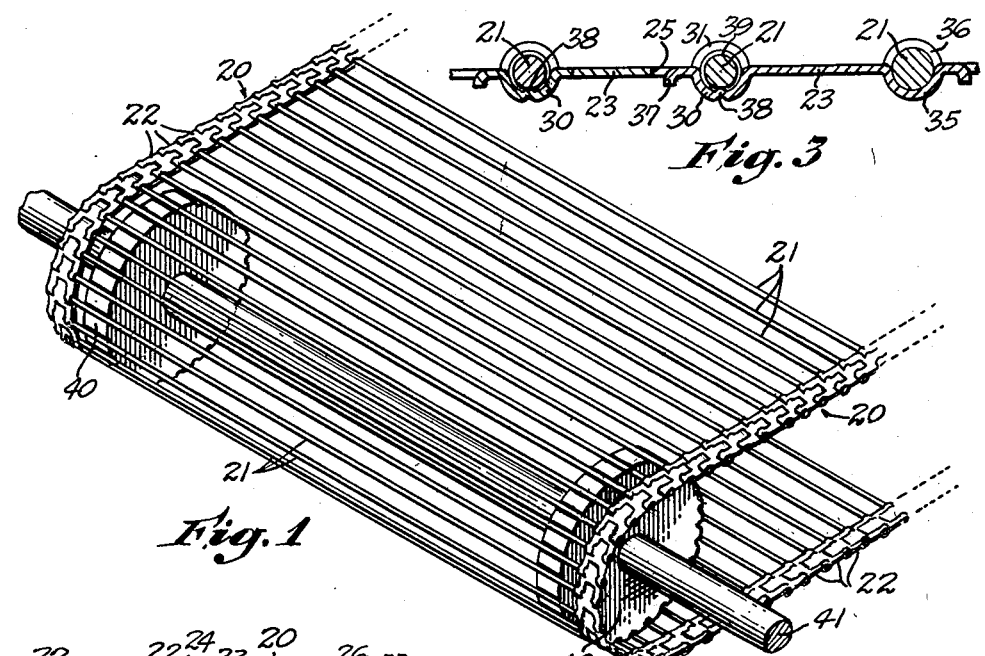
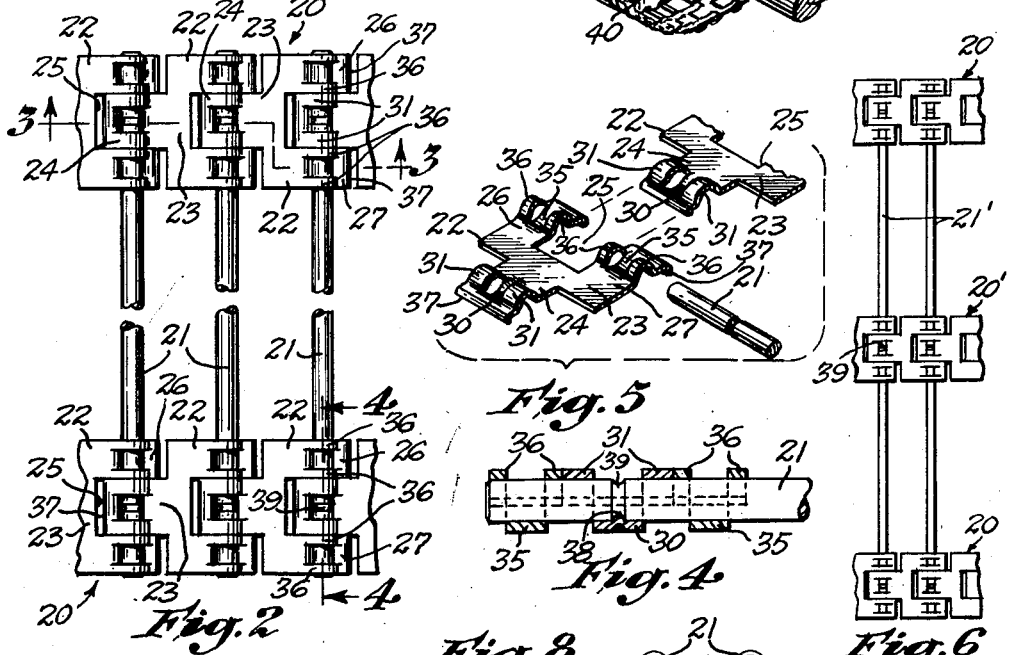
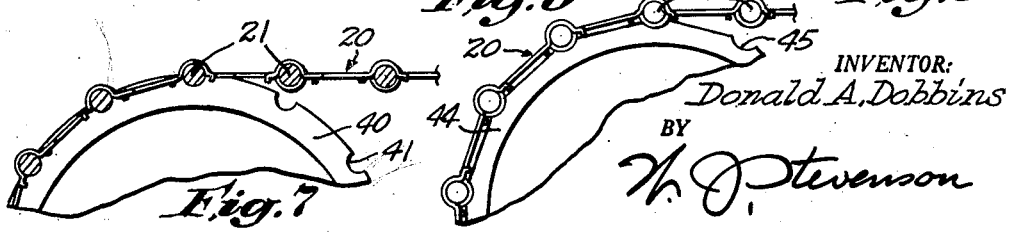
INVENTOR:
Donald A. Dobbins
BY
W. J. Stevenson Jan. 22, 1957 D. A. DOBBINS 2,778,480
CONVEYOR ELEMENT
Filed Jan. 27, 1955 2 Sheets-Sheet 2

INVENTOR:
Donald A. Dobbins
BY
N. J. Stevenson

United States Patent Office 2,778,480
Patented Jan. 22, 1957

2,778,480

CONVEYOR ELEMENT

Donald A. Dobbins, Burbank, Calif.

Application January 27, 1955, Serial No. 484,552

4 Claims. (Cl. 198—195)

This invention relates generally to conveyor equipment and particularly to a novel endless conveyor chain for supporting and transporting various articles through a predetermined path.

Endless conveyor belts, chains, etc., are employed extensively in transporting various objects through baking, cooling, washing, painting, heat-treating, packaging and other stations in production lines. The present invention is concerned with a structure which falls within the category of an endless conveyor chain since it involves spaced parallel linkages between which extend rods or pins for supporting articles to be conveyed through a predetermined path, the improved rod-type conveyor being herein referred to as a "ladder chain."

It is an object of the present invention to avoid the disadvantages and deficiencies of prior conveyor chains by providing a ladder-type conveyor element which is highly practical and efficient in use, one which is especially simple in construction and economical to produce, and one which is conveniently assembled and disassembled without the need for tools and without the use of screws, pins, clips or other extraneous means for retaining the parts in connected relation.

Another object of the invention is to provide a ladder-type conveyor element which comprises a pair of side linkages and article-supporting rods extending transversely between the linkages with the ends of the rods providing pivot- or hinge-pins for connecting the individual links in articulated relation, the structure further involving a novel interengaging detent means on the links and rod ends by which axial displacement of the rods is prevented.

Another object of the invention is to provide a ladder-type conveyor element in which the side links provide greater unit bearing area in contact with the hinge pins, the bearings consisting of a plurality of semi-circular bearing areas provided on each of the interconnected ends of the interconnected links at opposite sides of the rods, said areas together providing complete, closed bearings affording adequate interengagement between the links and rods. In accordance with the invention, the link elements are sheet-metal stampings, the metal being lanced or slit and the metal between the slits being concaved alternately in upward and downward directions, the semi-cylindrical bearing portions thus formed being fixed relative to the link elements so that spreading or uncurling thereof, as is the case where curled bearing loops are employed, is positively prevented.

Another object of the invention is to provide a conveyor element, of the character referred to, in which the detent means for retaining each pair of the links and rod end in pivotal connection consists of a small projection or lug provided on one of the concave bearing portions and engageable in a peripheral groove in the rod, the detent projection being adapted to snap into the groove as the rod end is inserted into the bearing portions at the adjoining ends of the pair of links. Thus, by this provision, the parts are retained in hinged connection without the employment of separate locking expedients and the assembly and disassembly of the structure is greatly simplified and expedited.

Another important object of the invention is to provide a conveyor element of the rod or ladder type which is susceptible to modification to meet the various requirements, that is, to produce conveyor elements of various widths without material alteration in the structure. According to the invention, this objective is attained by simply providing rods of appropriate lengths and utilizing these rods in connection with either a single linkage or a pair of the linkages. In the event that a relatively wide conveyor is required, additional linkages are interposed between the outer, spaced parallel linkages and in this case the rods extend through the several bearings of the links to hingedly connect the latter and to provide adequate support for the elongate rods.

A further object of the invention is to provide a ladder type conveyor element of modified construction adapted for use in providing a planar, circular conveyor for transporting articles in a circular path, in a single plane. In this case, the axes of the link bearings and the rods converge toward the vertical axis around which the conveyor element revolves.

A still further object of the invention is to provide a ladder-type conveyor element which is adapted for actuation either upon or around "pitch-line" sprockets having tooth spaces in which the rods engage, or in connection with "chord line" sprockets having tooth grooves receiving the bearing portions of the linkages.

Further objects of the invention will appear from the following description and from the drawings which are intended for the purpose of illustration only, and in which:

Fig. 1 is a perspective view of one end of an endless conveyor chain or element embodying the present, improved construction;

Fig. 2 is a plan view of a portion of the conveyor element;

Figure 13:
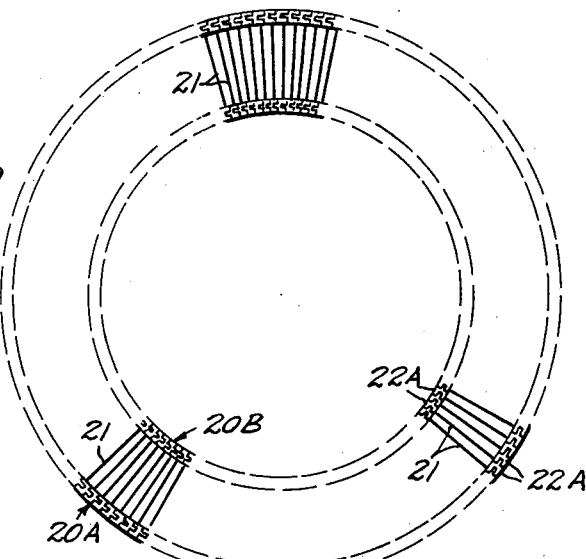

Figs. 3 and 4 are enlarged cross-sectional views, taken on lines 3—3 and 4—4 respectively of Fig. 2;

Fig. 5 is a composite, perspective view of a pair of the sheet-metal links and an end of one of the rods;

Fig. 6 is a plan view similar to Fig. 2, showing a conveyor element of extended width;

Figs. 7 and 8 are side views of different forms of sprockets which may be used to drive the conveyor;

Figs. 9, 10, 11 and 12 are plan views of conveyor elements of slightly modified construction; and Fig. 13 is a plan view of an endless conveyor element embodying the features of the elements illustrated in Figs. 1 to 12 but arranged in a single plane and in circular configuration.

In the embodiment of the invention illustrated in Figs. 1 to 5, inclusive, the improved rod-type conveyor element includes a pair of spaced, parallel, endless linkages 20 and rods 21 extending therebetween. Each linkage 20 consists of a plurality of sheet-metal links 22 joined in articulated relation in the manner and by the means to be later described.

Referring particularly to Fig. 5, each link 22 is stamped from sheet metal to provide a flat plate portion 23. At one end of the link 22 is an ear or tab 24 which projects from the plate portion 23. The opposite end of the link 22 is bifurcated, the plate portion being slotted to provide a recess 25 which is in longitudinal alignment with the ear 24 and of slightly greater width than the same. The metal at opposite sides of the recess provides a pair of tabs or ears 26 and 27 which may be of narrower width than the ear 24.

During the stamping operation, the projecting strip or ear 24 is lanced along two transversely spaced lines and the metal between the two lines or slits is bent or bowed downwardly to provide a semi-cylindrical depression or half-bearing 30. The metal at the sides of the lanced lines or slits is bowed upwardly to provide semi-cylindrical bearings 31. It is to be noted that each bearing 31 is of a width equal to one-half the width of the central bearing portion 30. Thus, the two bearing portions 31 together provide an upper concave bearing area which is equal to the bearing area of the central bearing portion 30.

The ears 26 and 27 are similarly lanced and the sheet metal between and at the sides of the slits being bent or curved in opposite directions to provide central, lower, semi-cylindrical bearing portions 35 and laterally spaced, upper semi-cylindrical bearing portions 36. Each of the upper bearing portions 36 of each ear 26 and 27 is of a width equal to one-half the width of the central bearing portion 35.

It is to be observed that the extremity of each ear 24, 26 and 27 is curved downwardly to provide, in effect, an angular cross-bar or flange 37 which greatly enhances the structural strength at the ends of the link and prevents tearing of the metal along the lance lines when unusual loads are supported by the ladder chain. Referring to Fig. 4, the metal of the bearing portion 30 is dimpled or indented to provide a small, upwardly projecting detent lug 38.

As shown best in Fig. 2, the plurality of links 22 are connected in articulated relation to provide the endless chain or linkage 20. To so assemble the links, the hinge ear 24 of one link is placed in the space 25 between the hinge ears 26 and 27 to axially align the several half-bearings 30, 31, 32, 35 and 36. An end portion of a rod 21 is then slid into and through the several bearings to serve as a hinge-pin for the pair of adjoining links. As shown in Figs. 2 and 5, each rod 21 is provided with a peripheral detent groove 39 near each end. When the end of the rod is inserted in the bearing portions of the adjoining links 22, the detent lug 38 snaps into the groove 39 to yieldingly retain the rod end in place and to thus maintain the links in pivotal connection.

The assembly procedure as outlined above is repeated to successively connect additional links with each link being joined to the previously connected link of the series. Eventually, a linkage of the required length is produced, at which time the ear 24 of the first or starting link is inserted between the ears 26 and 27 of the last-connected link and these two end links 22 then pivotally connected by a hinge rod 21 to provide an endless linkage. The links 22 of the linkage 20 at the opposite side of the conveyor element may be similarly assembled, with the opposite ends of the rods 21 hingedly connecting the bearing portions thereof, and this procedure may be carried out after the first linkage has been assembled, or during such assembly, as desired.

With the conveyor element thus completed, it is ready for installation in a conveyor system to extend around sprockets 40 carried by a shaft 41, as shown in Fig. 1. Only one set of sprockets is shown in the drawings but it will be understood that additional sprockets are provided so that a portion of the ladder chain conveyor will extend in a horizontal plane to convey articles through a straight path. As shown in Figs. 1 and 7, each sprocket 40 may have circumferentially-spaced grooves 41 of semi-circular outline adapted to receive the rods 21 of the conveyor element. The sprockets 40, which may be arranged to engage the portions of the rods 21 adjacent the linkages 20, may be regarded as pitch-line sprockets since the outer surfaces of the teeth between the grooves 41 form the circumference of the sprocket and coincide with the circular pitch line of the grooves. When the sprockets 40 are rotated, they act through the interengaging rods 21 and grooves 41 to cause the conveyor element to travel in a rectilinear path.

It is also practical to drive the endless conveyor element through the medium of chord line sprockets 44 of the type shown in Fig. 8. In this case, the sprockets 44 are located directly in alignment with the linkages 20 so that their grooves 45 receive the lower bearing portions 30, 36 of the links 22 to drive the conveyor element. Since the flat plate portions 23 of the links must extend tangentially of the sprocket, the peripheral surfaces of the sprocket between the grooves 45 must be in the nature of flat chordal surfaces.

It is thus seen that the conveyor element may be driven either by the pitch-line sprockets 40 at any selected points along its rods, or at the extreme edges of the element by the link-engaging, chord-line sprockets 44, or by both, as desired.

It is important to note that while each of the half-bearings 30, 31, 35 and 36 provides a curved bearing area which embraces only one-half the circumference of a rod 21, these several bearings together provide, in effect, a continuous bearing extending transversely of each pair of connected links 22, as illustrated in Figs. 3 and 4. This continuous bearing embraces alternately upper and lower peripheral portions of the hinge rod 21 throughout the width of the connected links. It is thus seen that the three semicircular bearing portions of each ear 24, 26 and 27 cooperate in providing a completely closed, circular bearing for the hinge rod 21. Consequently, since the individual bearing portions are devoid of free ends looped around the rod, they cannot open when subjected to unusual loading to release the rod and cause parting of the linkage. The present structure thus is an important improvement over similar structures in which the hinge bearings are merely open loops curled around the hinge rods. Due to the cross-bars 37, the sides of the bearing portions which take the load imposed on the conveyor element are adequately reinforced so that the chain will withstand unusually heavy loading.

During operation of the conveyor system, the links 22 are adapted to pivot relative to one another and the rods 21 may rotate in the bearing portions so that more even wear between the parts is attained. After the conveyor element has been in operation over a long period of time, it may be necessary to tighten the chain and this may be accomplished by simply removing a corresponding link from each side of the element and the rod connecting these links. To remove the links, it is only necessary to force the rod 21 axially to free its grooves 39 from the detent lugs 38. Removal of a pair of adjacent rods 21 uncouples the linkages 20 and effects removal of the corresponding links 22 at the sides of the conveyor element. The ends of the linkages 20 are then re-connected in the manner as above explained to provide a conveyor element from which a rod 21 and a link 22 at each side have been removed to reduce the length of the element by one link.

Referring now to Fig. 6, the present invention also contemplates the provision of a conveyor element which is adapted to be expanded in width to meet the various requirements. To produce a relatively wide conveyor element, one or more additional linkages 20' are arranged between the side linkages 20 and parallel thereto, the linkage 20' being identical to the linkages 20. In this structure, the rods 21' are similar to the rods 21 but are considerably longer and have additional detent grooves 39 for receiving the detent lugs 38 of the linkage 20'. By this provision, one or more linkages 20' may be employed intermediate the sides of the conveyor element to strengthen the same. At the same time, additional sprockets may be provided for supporting the wide conveyor element intermediate its side edges.

Figure 12:
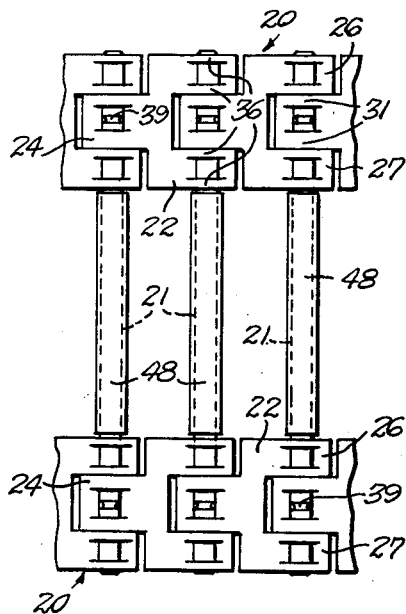

As shown in Fig. 12, it may be desirable to provide transverse roller means, in lieu of the relatively non-rotatable rods 21. In such event, tubes 48 may be slid over the rods 21 to be rotatably supported thereby.

Figure 9:
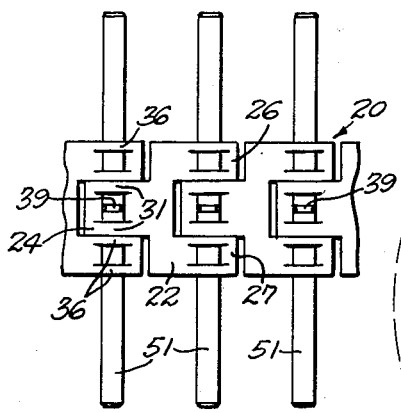
Figure 10:
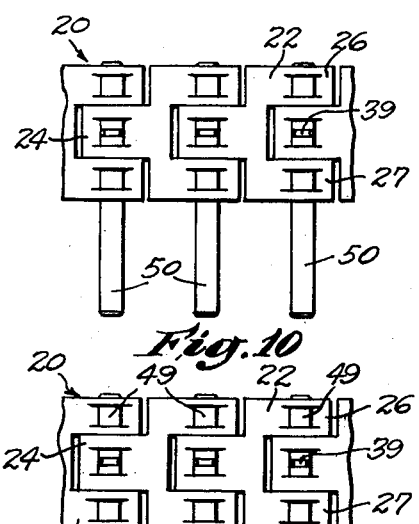
Figure 11:
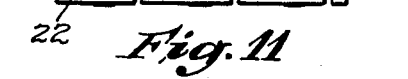

In some instances, a relatively narrow conveyor element may be required, such elements being illustrated in Figs. 9 to 11, inclusive. In these typical cases, a single linkage 20 is employed and preferably extends around sprockets of the type shown in Fig. 8. In the embodiment shown in Fig. 11, the links 22 of the chain 20 are pivotally connected by pins or short rods 49 which are similar to the rods 21 but do not project from either side of the linkage. In Fig. 10 is shown a linkage wherein the pivot pins or rods 50 project from one side of the chain, and in Fig. 9 similar pivot pins or rods 51 have their ends projecting from both sides of the chain 20. In the several forms shown in Figs. 9, 10 and 11, the pivot pins or rods are provided with detent grooves 39 engageable by the detent lugs on the links 22 to releasably retain the parts in pivotal connection. The conveyor elements of Figs. 9, 10 and 11 may be driven by sprockets of the type shown in Fig. 8.

Referring now to Fig. 13, it is also within the concept of this invention to provide a modified conveyor element capable of transporting articles in a planar, circular path. In this case, the linkages 20A and 20B are arranged coplanar and concentric to adapt them to move in a circle. In this case, the axes of the bearings of the individual links 22A converge toward the axis of rotation of the conveyor element. In all other respects, the alternative conveyor element is identical to the element shown in the preceeding views and described above. The modified element is preferably supported for rotation upon an annular guideway and may be rotated by one or more sprockets of the type shown in either Fig. 7 or Fig. 8.

In accordance with the provisions of the patent statutes, I have herein described the principle of the invention, together with the conveyor element structures which I now consider to represent the best embodiments thereof. I wish to have it understood, however, that various other modifications might be made in the structure and arrangement of the parts without departing from the spirit or scope of the invention, as defined in the appended claims.

I claim as my invention:

1. A conveyor element, comprising: spaced parallel linkages, each linkage consisting of a plurality of sheet-metal links each having a flat horizontal plate portion provided with at least one ear projecting longitudinally at each end, each of said ears having transversely-spaced, longitudinal slits, the metal between the slits providing bearing strips, said strips being integral with said plate portion throughout and being of semi-circular shape, said strips providing semi-cylindrical bearing sockets arranged in reverse order alternately above and below the plane of the plate portion with the axes of the bearing sockets in alignment and extending transversely of the plate portion within said plane, said bearing sockets together providing a substantially continuous transverse bearing, the ears of adjoining links interfitting in hinge-leaf fashion with their bearing socket portions coaxially aligned transversely of the linkage; rods extending transversely between the linkages with their ends rotatable in said bearing portions to pivotally connect said links; and interengaging detent means on said rod ends and on at least one of said bearing socket portions by which the links and rods are retained in pivotal connection.

2. A conveyor element, comprising: spaced parallel linkages, each linkage consisting of a plurality of sheet-metal links each having a flat horizontal plate portion provided with at least one ear projecting longitudinally at each end, each of said ears having transversely-spaced, longitudinal slits, the metal between the slits providing bearing strips, said strips being integral with said plate portion throughout and being of semi-circular shape, said strips providing semi-cylindrical bearing sockets arranged in reverse order alternately above and below the plane of the plate portion with the axes of the bearing sockets in alignment and extending transversely of the plate portion within said plane, said bearing sockets together providing a substantially continuous transverse bearing, each of said ears having a cross-bar joining said bearing strips at the free end of the ear, the ears of adjoining links interfitting in hinge-leaf fashion with their bearing socket portions coaxially aligned transversely of the linkage; rods extending transversely between the linkages with their ends rotatable in said bearing portions to pivotally connect said links; and interengaging detent means on said rod ends and on at least one of said bearing socket portions by which the links and rods are retained in pivotal connection.

3. A conveyor element, comprising: spaced parallel linkages, each linkage consisting of a plurality of sheet-metal links each having a flat horizontal plate portion provided with at least one ear projecting longitudinally at each end, each of said ears having transversely-spaced, longitudinal slits, the metal between the slits providing bearing strips, said strips being integral with said plate portion throughout and being of semi-circular shape, said strips providing semi-cylindrical bearing sockets arranged in reverse order alternately above and below the plane of the plate portion with the axes of the bearing sockets in alignment and extending transversely of the plate portion within said plane, said bearing sockets together providing a substantially continuous transverse bearing, each of said ears having a cross-bar joining said bearing strips at the free end of the ear, said cross-bar being of angular cross-sectional shape, the ears of adjoining links interfitting in hinge-leaf fashion with their bearing socket portions coaxially aligned transversely of the linkage; rods extending transversely between the linkages with their ends rotatable in said bearing portions to pivotally connect said links; and interengaging detent means on said rod ends and on at least one of said bearing socket portions by which the links and rods are retained in pivotal connection.

4. A conveyor linkage, comprising: a plurality of sheet-metal links each having a flat horizontal plate portion, a first ear projecting longitudinally from one end of the plate portion and a pair of transversely-spaced ears projecting longitudinally from the other end of the plate portion, each ear having transversely-spaced, longitudinal slits defining transversely-spaced, longitudinal strips, said strips being bowed alternately upwardly and downwardly in semicircular form from the plane of the plate portion and providing semi-cylindrical bearing portions, said slits terminating short of the free ends of the ears to provide cross-bars extending transversely of the slits, the ears of adjoining links interfitting in hinge-leaf fashion with their bearing portions axially aligned and together providing a substantially continuous bearing means extending throughout the entire width of the linkage; a hinge pin rotatable in each of said bearing means and having a peripheral groove; and a detent lug integral with one of said semicircular bearing portions of each bearing means, said lug being engageable in a said groove to retain a said hinge pin in said bearing means.

References Cited in the file of this patent
UNITED STATES PATENTS

| | | |
|---|---|---|
| 777,363 | Abels | Dec. 13, 1904 |
| 2,126,274 | Noffsinger et al. | Aug. 9, 1938 |
| 2,645,133 | David | July 14, 1953 |